(12) United States Patent
Solhusvik (10) Patent No.: US 9,819,889 B2
(45) Date of Patent: Nov. 14, 2017

(54) METHOD AND SYSTEM TO IMPLEMENT A STACKED CHIP HIGH DYNAMIC RANGE IMAGE SENSOR

(71) Applicant: OMNIVISION TECHNOLOGIES, INC., Santa Clara, CA (US)

(72) Inventor: Johannes Solhusvik, Haslum (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/821,651

(22) Filed: Aug. 7, 2015

(65) Prior Publication Data

US 2017/0041562 A1    Feb. 9, 2017

(51) Int. Cl.
*H04N 5/378* (2011.01)
*H04N 5/3745* (2011.01)
*H04N 5/355* (2011.01)

(52) U.S. Cl.
CPC ......... *H04N 5/378* (2013.01); *H04N 5/35581* (2013.01); *H04N 5/37457* (2013.01); *H04N 5/35554* (2013.01)

(58) Field of Classification Search
CPC .. H04N 5/35554; H04N 5/378; H04N 5/2355; H04N 5/2353; H04N 5/35581; H01L 27/14603
See application file for complete search history.

(56) References Cited

U.S. PATENT DOCUMENTS

2012/0307114 A1   12/2012  Ward et al.
2013/0208138 A1*   8/2013  Li ..................... H04N 5/2353
                                                 348/229.1
2014/0263950 A1    9/2014  Fenigstein et al.
2014/0267828 A1*   9/2014  Kasai ................... H04N 9/045
                                                 348/229.1
2015/0201139 A1    7/2015  Funatsu et al.

FOREIGN PATENT DOCUMENTS

TW    201220836 A    5/2012
TW    201325227 A    6/2013
TW    201511562 A    3/2015

OTHER PUBLICATIONS

Search Report for Patent Application—ROC (Taiwan) Patent Application No. 105119217 dated Feb. 21, 2017.

\* cited by examiner

*Primary Examiner* — Ahmed A Berhan
(74) *Attorney, Agent, or Firm* — Christensen O'Connor Johnson Kindness PLLC (57) ABSTRACT

Method of implementing stacked chip HDR algorithm in image sensor starts with pixel array capturing first frame with first exposure time and second frame with a second exposure time that is longer or shorter than the first exposure time. Pixel array is disposed in first semiconductor die and is partitioned into pixel sub-arrays. Each pixel sub-array is arranged into pixel groups, and each pixel group is arranged into pixel cell array. Readout circuits disposed in second semiconductor die acquire image data of first and second frame. Each pixel sub-array is coupled to a corresponding readout circuit through a corresponding one of a plurality of conductors. ADC circuits convert image data from first and second frames to first and second ADC outputs. Function logic on the second semiconductor die adding first and second ADC outputs to generate a final ADC output. Other embodiments are also described.

22 Claims, 6 Drawing Sheets

METHOD AND SYSTEM TO IMPLEMENT A STACKED CHIP HIGH DYNAMIC RANGE IMAGE SENSOR

FIELD

An example of the present invention relates generally to image sensors. More specifically, examples of the present invention are related to methods and systems to implement a stacked chip high dynamic range image sensor.

BACKGROUND

High speed image sensors have been widely used in many applications in different fields including the automotive field, the machine vision field, and the field of professional video photography. The technology used to manufacture image sensors, and in particular, complementary-metal-oxide-semiconductor (CMOS) image sensors, has continued to advance at great pace. For example, the demand of higher frame rates and lower power consumption has encouraged the further miniaturization and integration of these image sensors.

One way to increase the frame rate of a CMOS image sensor may be to increase the number of readout circuits operating in parallel. In conventional image sensors, one column of pixels in a pixel array may share one readout circuit. In other examples of the conventional art, one column of pixel cells in a pixel array may share a plurality of readout circuits. These solutions provide a higher frame rate, but require more silicon area, which is not helpful in the miniaturization of silicon image sensors.

Further, many applications require a high dynamic range (HDR) to capture the scene illuminations ranges from $10^{-1}$ for night vision to $10^5$ lux for bright sunlight or direct headlights light condition. This high dynamic range corresponds to a dynamic range of at least 100 dB. Current Charge-coupled devices (CCD) and CMOS sensors cannot achieve this range due to the full well limitation and noise floor limitation, which is typically around 60~70 dB. A high dynamic range sensor design is needed to extend the applications of CMOS image sensor into the high dynamic range areas.

BRIEF DESCRIPTION OF THE DRAWINGS

The embodiments of the invention are illustrated by way of example and not by way of limitation in the figures of the accompanying drawings in which like references indicate similar elements throughout the various views unless otherwise specified. It should be noted that references to "an" or "one" embodiment of the invention in this disclosure are not necessarily to the same embodiment, and they mean at least one. In the drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. However, it is understood that embodiments of the invention may be practiced without these specific details. In other instances, well-known circuits, structures, and techniques have not been shown to avoid obscuring the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Particular features, structures or characteristics may be included in an integrated circuit, an electronic circuit, a combinatorial logic circuit, or other suitable components that provide the described functionality.

As will be disclosed in various examples, an effective method to read out a pixel array with high dynamic range (HDR) that utilizes pixel sub-arrays that are arranged in a stacked CMOS chip solution in which pixel cells are included in a first semiconductor die, and in which readout circuitry is included in a second semiconductor die. For instance, in one example, the first semiconductor die may be a pixel die, and the second semiconductor die may be an application specific integrated circuit (ASIC) die. In one example, the pixel sub-arrays may be made up of clusters of n×m pixel groups. In the example, the amplifier output nodes of the pixel cells inside the n×m pixel groups are coupled together such that each one of the n×m pixel groups share a single readout circuit included in readout circuitry in accordance with the teachings of the present invention. In the example, the pixel sub-arrays are read out in parallel at high speed and/or with low power in accordance with the teachings of the present invention. In one example, the HDR of the stacked chip image sensor with shared pixel architecture where a cluster of pixels cells share a readout circuitry is increased.

Figure 1:
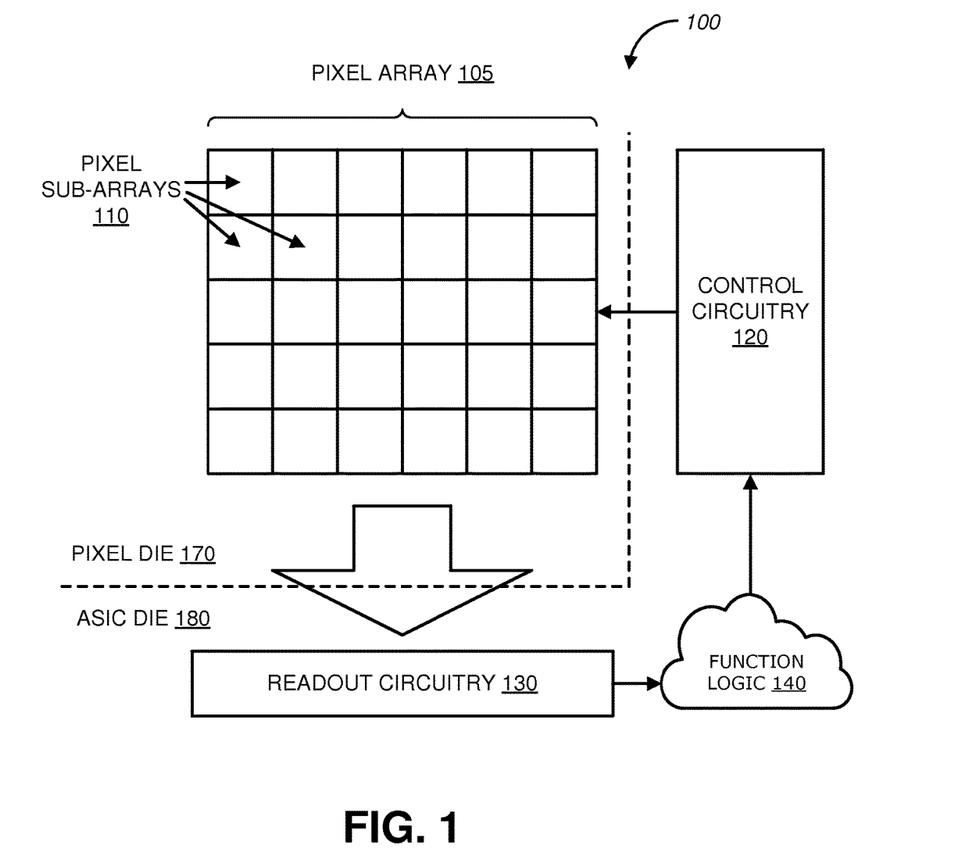
FIG. 1 is a block diagram illustrating an example imaging system that includes an image sensor having a pixel array with a plurality of pixels arranged in pixel sub-arrays with pixel architecture for high dynamic range (HDR) in a stacked CMOS image sensor scheme in accordance to one embodiment of the invention.

FIG. 1 is a block diagram illustrating an example imaging system that includes an image sensor having a pixel array with a plurality of pixels arranged in pixel sub-arrays with pixel architecture for high dynamic range (HDR) in a stacked CMOS image sensor scheme in accordance to one embodiment of the invention. As illustrated in FIG. 1, imaging system 100 includes an image sensor having a pixel array 105 partitioned into a plurality of pixel sub-arrays including a pixel architecture for HDR in a stacked image sensor scheme in accordance with the teachings of the present invention. In the illustrated example, imaging system 100 is realized with stacked CMOS chips, which include a pixel die 170 stacked with and coupled to an ASIC die 108. For instance, in one example, pixel die 170 includes a pixel array 105, and ASIC die 180 includes control circuitry 120, readout circuitry 130, and function logic 140. In the depicted example, control circuitry 120 is coupled to control operation of pixel array 105, which is coupled to be read out by readout circuitry 130 through bitlines 260 (in FIG. 2).

In particular, in the example depicted in FIG. 1, pixel array 105 is a two-dimensional (2D) array that is partitioned into a plurality of pixel sub-arrays 110 as shown. In one example, each pixel sub-array 110 includes a plurality of pixel groups, each of which includes a plurality of pixel cells (not shown in FIG. 1). In the example, each one of the plurality of pixel groups in a pixel sub-array is coupled to utilize the same bit line of bit lines 260, and share the same readout circuit in readout circuitry 130, more details of which will be described below in connection with FIG. 2.

Control circuitry 120 is coupled to pixel array 105 to control the operational characteristics of pixel array 105. In one example, control circuitry 120 is coupled to generate a global shutter signal for controlling image acquisition for each pixel cell. In the example, the global shutter signal simultaneously enables particular pixel cells within all pixel sub-arrays 110 of pixel array 105 to simultaneously transfer the image charge from their respective photodetector during a single acquisition window. In one embodiment, the control circuitry 120 controls the pixel array to cause the pixel array 105 to capture a first frame with a first exposure time and a second frame with a second exposure time. The first exposure time ("Tlong") may be longer than the second exposure time ("Tshort"). In other embodiments, the first time exposure time ("Tshort") may be shorter than the second exposure time ("Tlong"). In one embodiment, an automatic exposure control logic is included in function logic 140 and determines a ratio of the first exposure time to the second exposure time. The automatic exposure control logic thus calculates the appropriate exposure values (e.g., the first and second exposure time) which are transmitted to the control circuitry 120 to implement the exposure values during capture and readout of the pixel array 105. In this embodiment, a gain factor is determined by the ratio of the first exposure time to the second exposure time. The gain factor may be determined by control circuitry 120 or function logic 140.

In one example, after each of the pixel cells in a pixel sub-array 110 has acquired or captured its image data or image charge, the image data is read out by readout circuitry 130 through a bit line of bit lines 260. In one embodiment, a logic circuitry (not shown) can control readout circuitry 130 and output image data to function logic 140. Function logic 140 may simply store the image data or even manipulate the image data by applying post image effects (e.g. crop, rotate, remove red eye, adjust brightness, adjust contrast, or otherwise).

Figure 2:
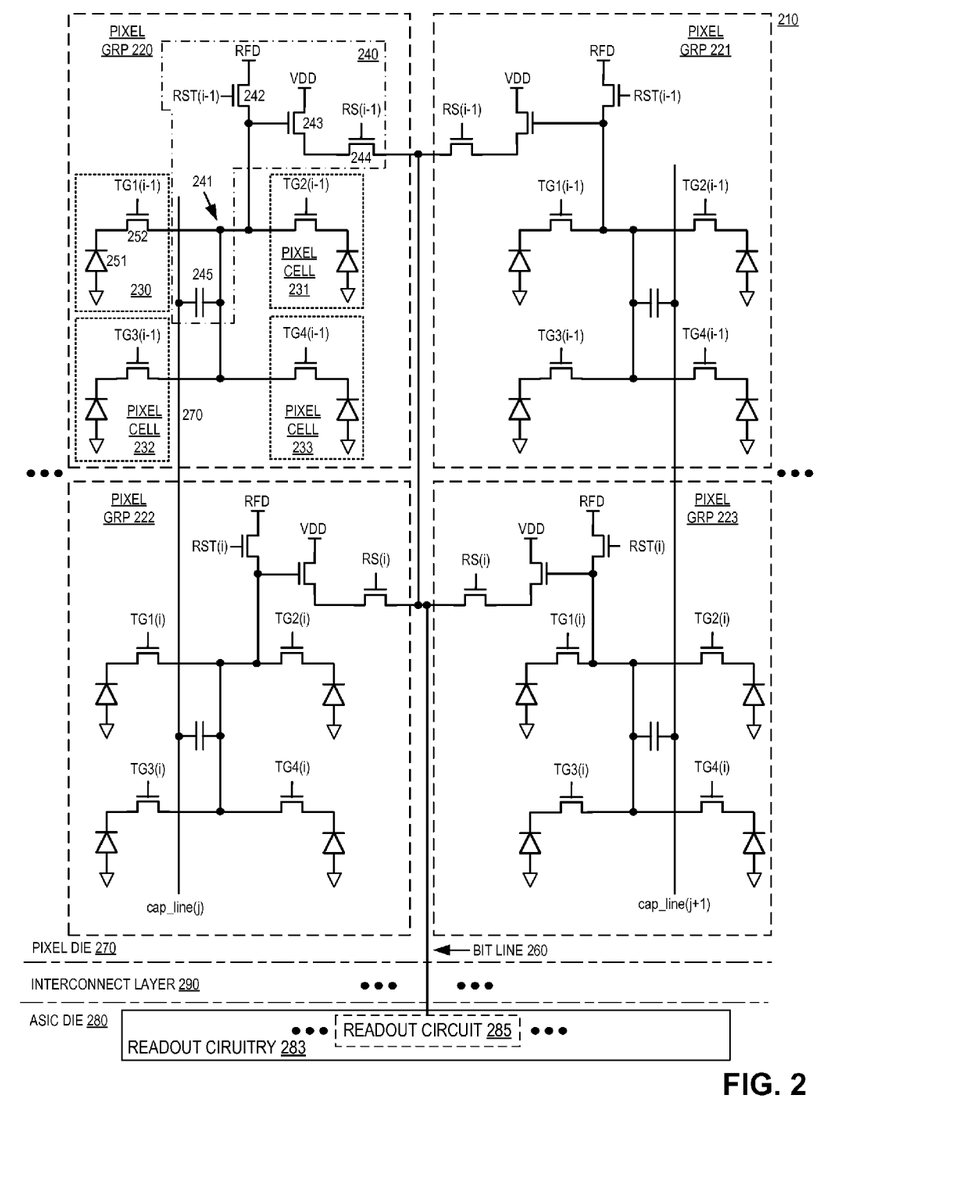
FIG. 2 is a schematic of a portion of an image sensor including an example pixel sub-array included in a pixel array in accordance with the teachings of the present invention.

FIG. 2 is a schematic of one example of a portion of an image sensor including a pixel sub-array 210, which may be one of a plurality of pixel sub-arrays included in a pixel array, such as for example pixel array 105 of FIG. 1, in accordance with the teachings of the present invention. In the example depicted in FIG. 2, pixel sub-array 210 includes a plurality of pixel groups 220, 221, 222, and 223 that arranged into n=2 columns and m=2 rows. Each of the four pixel groups 220, 221, 222, and 223 that make up pixel sub-array 210 in the example depicted in FIG. 2 includes four pixel cells 230, 231, 232 and 233 arranged into p=2 columns and q=2 rows, and pixel support circuitry 240 that is shared by all four pixel cells 230, 231, 232 and 233, of each pixel group 220, 221, 222, and 223.

The pixel cell is the smallest repeating unit in pixel array 105 of FIG. 1, and each of the pixel cells 230, 231, 232, and 233 shown in the example illustrated in FIG. 2 includes a photodetector 251 and transfer transistor 252, which is coupled to be controlled by a transfer signal TG. Transfer transistors arranged in the same row in pixel array 105, and in the same position within a respective pixel group may be controlled by the same transfer signal. For example, transfer transistor 252 of pixel cell 230, arranged in the upper left corner of pixel group 220 is controlled by transfer signal TG1(i−1), and the corresponding pixel cell in pixel group 221 that is arranged in the same row as pixel cell 230 in pixel group 220, also includes a transfer transistor that is controlled by transfer signal TG1(i−1) as shown.

Each of the four transfer transistors 252 in pixel cells 230, 231, 232, and 233 of a particular pixel group, such as pixel group 220, shares a single floating diffusion node 241. Each of the pixel support circuitry 240 shown in the illustrated example is coupled to and is shared by the four transfer transistors 252 in pixel cells 230, 231, 232, and 233 of each particular pixel group, and includes a reset transistor 242, an amplifier transistor 243, which in the illustrated example is a source follower (SF) coupled transistor 243, a row select transistor 244, and a capacitor 245, which is coupled to a capacitor line 270. Floating diffusion node 241 is coupled to be reset to a floating diffusion reset voltage via power supply RFD through a reset transistor 242. Reset transistor 242 is coupled to be controlled in response to a reset signal RST. In the example, pixel groups that are arranged in the same row are controlled by the same reset signal. For instance, pixel groups 220 and 221 are controlled by reset signal RST(i−1), while pixel groups 222 and 223 are controlled by reset signal RST(i).

Floating diffusion node 241 is also coupled to the control terminal of an amplifier transistor, which in FIG. 2 is the source follower transistor 243 having its gate terminal coupled floating diffusion node 241, and drain terminal coupled to power supply VDD. In the depicted example, row select transistor 244 is controlled by a row select signal. In the example, pixel groups that are arranged in the same row are controlled by the same row select signal RS. For instance, pixel groups 220 and 221 are controlled by row select signal RS(i−1), while pixel groups 222 and 223 are controlled by row select signal RS(i). In one example, row select transistor 244 is coupled between bit line 260 and the source terminal of source follower transistor 243. The drain terminal of source follower transistor 243 is coupled to the power supply VDD. Pixel cells in the same pixel sub-array are coupled to the same bit line.

Capacitor 245 is coupled between floating diffusion 241 and capacitor line 270. In the depicted example, capacitor line 270 coupled to pixel groups 220 and 222 is coupled to receive a signal cap_line(j). Capacitor 245 may increase the capacitance of floating diffusion node 241 to increase the dynamic range of a pixel cell in response to cap_line(j). In the illustrated example, capacitor 245 of each pixel group 220, 221 222, and 223 may be used to disable other pixel groups when a certain pixel group is being read. For instance, pixel groups 220 and 222 may be disabled during the read out of pixel groups 221 and 223 by applying a low voltage to capacitor line 270 in response to cap_line(j). Similarly, pixel groups 221 and 223 may be disabled during the read out of pixel groups 220 and 222 by apply a low voltage via cap_line(j+1).

In other examples, it is appreciated that capacitor 245 and capacitor line 270 may be omitted, and pixel groups that contain pixels cells that are not being read out may be disabled by applying a low voltage to RFD. In other examples, pixel groups which contain pixel cells that are not being read out may be disabled by coupling a pull down transistor between floating diffusion 241 and a low voltage such as ground, and enabling the pull down transistor to provide the low voltage to floating diffusion 241.

As summarized above, it is noted that in the example depicted in FIG. 2 that pixel sub-array 210 includes a plurality of pixel groups arranged in a n×m array, where n=2 and m=2. In addition, it is noted that each pixel group includes a plurality of pixel cells arranged in a p×q array, where p=2 and q=2, and where the pixel cells in each pixel group all share the same pixel support circuitry 240. It is appreciated of course that the illustrated example utilizes n=2, m=2, p=2, and q=2, for explanation purposes, and that in other examples, other values may be utilized for n, m, p, and q, where n>1, m>1, p>1, and q>1, and where n, m, p, and q are integers.

As illustrated in the depicted example, all of the pixel cells of pixel sub-array 210, are formed on a pixel die 270, and share the same bit line 260. In one example, bit line 260 may couple all of the pixel cells of pixel sub-array 210 to a single readout circuit 285, which may be included as one of a plurality of readout circuits included in readout circuitry 283 formed on an ASIC die 280 that is stacked with and coupled to pixel die 270. In one example, each single readout circuit 285 of the plurality of readout circuits included in readout circuitry 283 is coupled to a single one of the plurality of pixel sub arrays through a single bit line 260. In one example, an interconnect layer 290 is disposed between the pixel die 270 and ASIC die 280. In one example, interconnect layer 290 may include a plurality of conductors. In example, each one of the plurality of conductors may be utilized to couple the readout circuitry 283 to the circuitry included in pixel die 270.

For instance, in the example depicted in FIG. 2, bit line 260 is realized using one of the plurality of conductors that are included in interconnect layer 290. In other words, in one example, each single one of the plurality of pixel sub-arrays (e.g., pixel sub-array 210) in pixel die 270 may be coupled to a corresponding single one of a plurality of readout circuits (e.g., readout circuit 285) included in readout circuitry 283 in ASIC die 280 through a corresponding single one of the plurality of conductors (e.g., bit line 260) included in interconnect layer 290. As such, in one example, each single one of the plurality of pixel sub arrays may be read out in parallel by a corresponding single one of the plurality of readout circuits through a corresponding single one of the plurality of conductors, or single bit line, in accordance with the teachings of the present invention.

In one example, the interconnect layer 290 may include vias such as micro-through silicon vias (μTSVs) or through silicon vias (TSVs). In other examples, one pixel sub-array 210 may be coupled to more than one readout circuit 285 formed on ASIC die 280. In yet other examples, two or more pixel sub-arrays 210 may share one readout circuit 285 formed on an ASIC die 280. In one example, each of the plurality of readout circuits 285 may include analog-to-digital converter (ADC) circuits, adders, and memory, such as static random access memory (SRAM) or dynamic random access memory (DRAM), that are formed on ASIC die 280. In still other examples, each of the plurality of readout circuits 285 may include ADC circuits and adders formed on an ASIC die 280, with memory such as SRAM and DRAM formed on a memory die, which may be coupled to ASIC die 280 through an interconnect layer.

Figure 3:
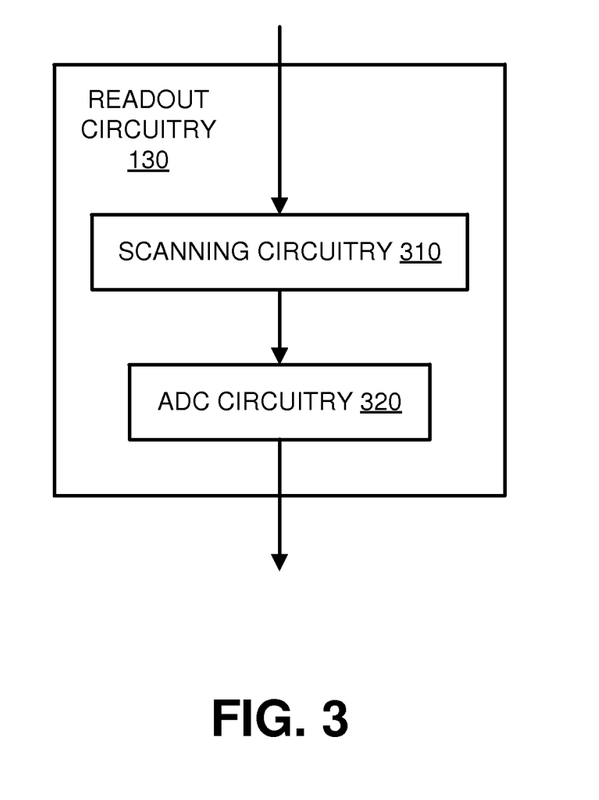
FIG. 3 is a block diagram illustrating the details of the readout circuitry in FIG. 1 in accordance to one embodiment of the invention.

Referring to FIG. 3, a block diagram illustrates the details of one of the plurality of readout circuits in readout circuitry 130 in FIG. 1 in accordance to one embodiment of the invention. As shown in FIG. 3, readout circuitry 130 may include scanning circuit 310, and an ADC circuitry 320. Scanning circuit 310 may also include amplification circuitry, selection circuitry (e.g., multiplexers), etc. to readout a row of image data at a time along readout bit lines 260 or may readout the image data using a variety of other techniques, such as a serial readout or a full parallel readout of all pixels simultaneously. In one embodiment, readout circuitry 130 reads out image data from pixel array 105 that includes reading out the image data from two frames having set exposure times. The first frame may have an exposure time ("Tlong") that is longer than the second frame's exposure time ("Tshort"). In other embodiments, the first frame may have an exposure time ("Tshort") that is shorter than the second frame's exposure time ("Tlong"). Scanning circuit 130 acquires the image data of the first frame and the image data of the second frame. In one embodiment, the image data of the first frame may be stored in function logic 140. The storing of the image data of the first frame may be performed prior to capturing the second frame with the shorter or longer exposure time by pixel array. ADC circuitry 320 may convert each of the image data from scanning circuit 310 from analog to digital. For example, ADC circuits 320 included in readout circuits, respectively, may convert the image data of the first frame from analog to digital to obtain a first ADC output and the image data of the second frame from analog to digital to obtain a second ADC output. Referring back to FIG. 1, function logic 140 may add the first and second ADC outputs to generate a final ADC output. An external host may then perform HDR combination and linearization. The HDR combination and linearization is performed on a per pixel, per pixel cluster, or per sub-array basis. Accordingly, the exposure ratio may be changed on a per pixel, per pixel cluster, or per sub-array basis. For example, each cluster (or sub-array) may dynamically determine (e.g., using a previous frame) the ratio of the longer exposure time (Tlong) to the short exposure time (Tshort).

In one embodiment, pixel array 105 may capture the first frame with the long exposure time. Readout circuitry 130 or function logic 140 may store the output of ADC circuitry 320. The pixel array 105 may then capture the second frame with the shorter exposure time. ADC output for the second frame is readout and added to the ADC output of the first frame. In this embodiment, the ADC circuitry 320 is 9 bits in size. The result of the addition of the ADC outputs for the first and second frames is stored in a frame buffer. In one embodiment, the result of the addition is 10 bits of data and the frame buffer is 10 bits in size. An external host (off-chip) may then perform HDR combination and linearization of the result of the addition.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
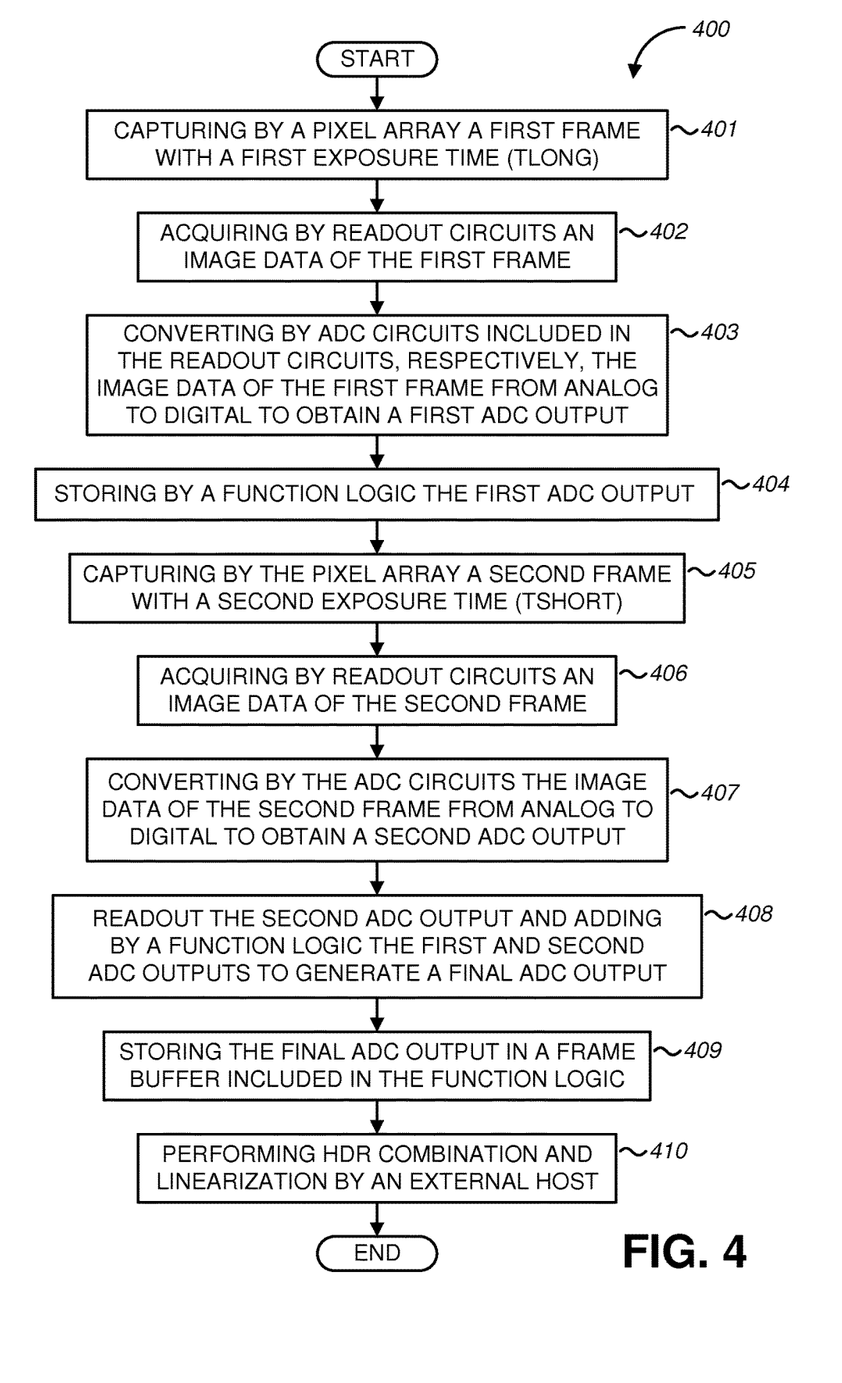
FIG. 4 is a flow chart showing an example process for reading out a pixel array partitioned into pixel sub-arrays in accordance to one embodiment of the invention.

FIG. 4 is a flow chart showing an example process for reading out a pixel array partitioned into pixel sub-arrays in accordance to one embodiment of the invention. In the depicted example, it is appreciated that the process may be applied for example to the pixel sub-arrays as described in above with respect to FIG. 1 and/or FIG. 2. For instance, as described above, each pixel sub-array includes a plurality of pixel groups, each of which includes a plurality of pixel cells as discussed in detail above with respect FIG. 1 and/or FIG. 2. The method 400 starts at block 410 with pixel array capturing a first frame with a first exposure time. In one embodiment, pixel array is disposed in a first semiconductor die. At block 402, a plurality of readout circuits acquire an image data of the first frame. Readout circuits are included in readout circuitry disposed in a second semiconductor die. Each one of the plurality of pixel sub-arrays is coupled to a corresponding one of the plurality of readout circuits through a corresponding one of a plurality of conductors. At block 403, a plurality of ADC circuits respectively included in readout circuits convert the image data of the first frame from analog to digital to obtain a first ADC output. At block 404, function logic stores the first ADC output. Function logic may be disposed in the second semiconductor die. In one embodiment, a frame buffer included in function logic stores the first ADC output. At block 405, pixel array captures a second frame with a second exposure time. The first exposure time may be longer than the second exposure time. In other embodiments, the first time exposure time may be shorter than the second exposure time. At block 406, readout circuits acquire an image data of the second frame. At block 407, ADC circuits convert the image data of the second frame from analog to digital to obtain a second ADC output. At block 408, the second ADC output is readout and function logic adds the first and the second ADC outputs to generate a final ADC output. At block 409, the final ADC output is stored in the frame buffer included in function logic. At block 410, an external host performs HDR combination and linearization.

In another embodiment, rather than function logic storing the first ADC output at block 404, ADC circuits includes the frame buffer that stores the first ADC output. In this embodiment, ADC circuits also includes logic gates that are used to add the first and second ADC outputs at block 408 to generate the final ADC output that is stored in the ADC circuits' frame buffer at block 409. In another embodiment, the final ADC output may also be stored in a frame buffer included in function logic at Block 409.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

Figure 5A:
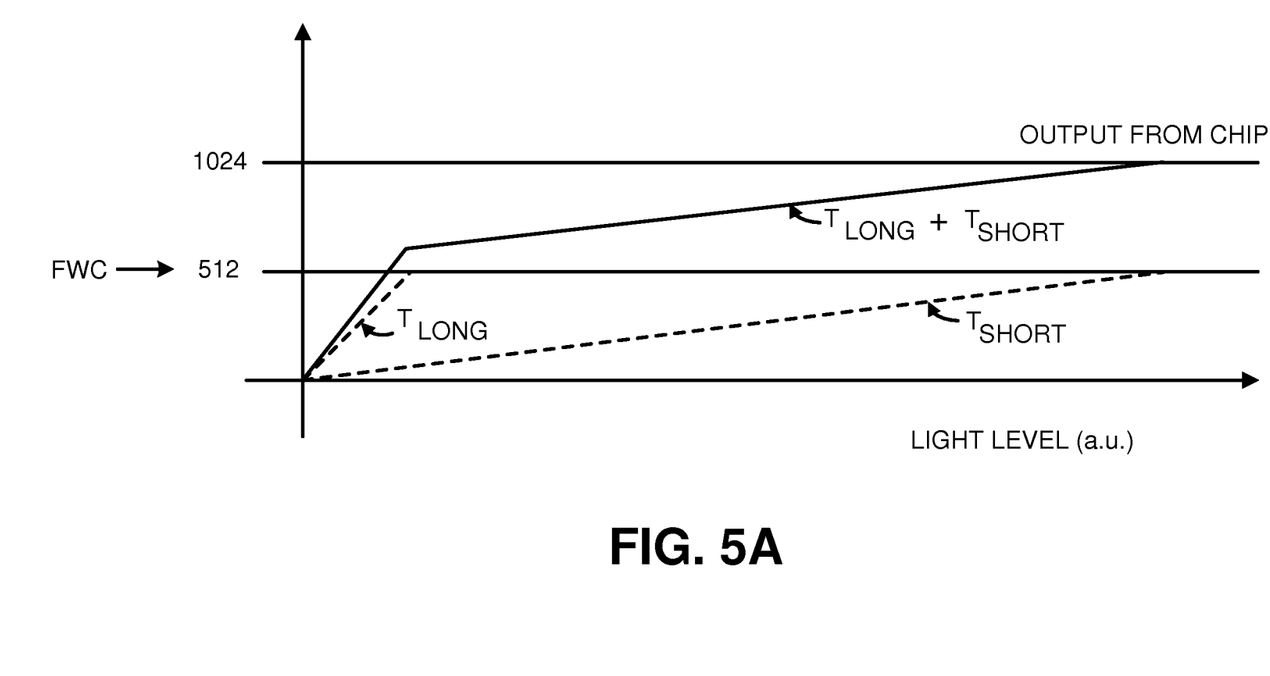
FIGS. 5(a) and 5(b) are graphs illustrating the light level with respect to the least significant bit (LSB) outputs for a longer time of exposure (Tlong) and a shorter time of exposure (Tshort) in accordance to one embodiment of the invention.
Figure 5B:
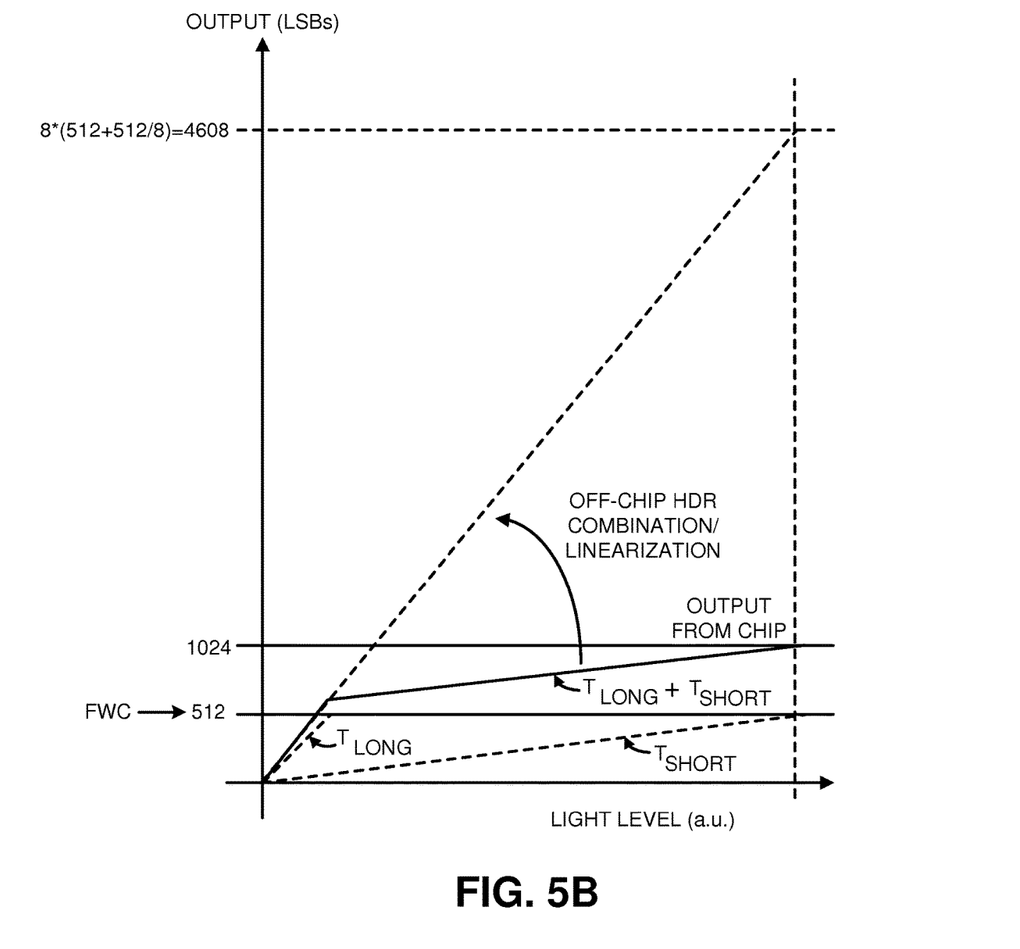

FIGS. 5(a) and 5(b) are graphs illustrating the light level with respect to the least significant bit (LSB) outputs corresponding to a frame with a longer exposure time (Tlong) and a frame with a shorter exposure (Tshort) according to one embodiment of the invention. Specifically, FIGS. 5(a) and 5(b) show the possible 9 bit ADC outputs (e.g., first and second ADC outputs) corresponding to the first frame having the longer exposure time (Tlong) and the second frame having the shorter exposure (Tshort) as well as the 10 bit final ADC output that is the result of the addition of the first and second ADC outputs. In other embodiments, the first frame may have the shorter exposure time ("Tshort") and the second frame may have the longer exposure time ("Tlong"). FIG. 5(b) further illustrates the result of HDR combination and linearization which may be performed off-chip by an external host. In both FIGS. 5(a) and 5(b), the Full Well Capacity (FWC) is indicated.

With the imaging system that includes an image sensor having a pixel array with a plurality of pixels arranged in pixel sub-arrays with pixel architecture for high dynamic range (HDR) in a stacked CMOS image sensor scheme in accordance to one embodiment of the invention, the dynamic range may be increased without increasing the output data rate. Normally, two or more frame captures must be output unless HDR combination is performed on-chip, which adds complexity and cost. Further, the imaging system and the readout method described herein increases the dynamic range of an image sensor without increasing the resolution of ADC circuitry 320. Finally, the imaging system and readout methods according to embodiments of the invention provides for adaptive exposure time and dynamic range across the pixel array, and specifically, provides cluster level control of the pixel array rather than on a frame-level.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of implementing a stacked chip high dynamic range (HDR) algorithm in an image sensor comprising:
    capturing by a pixel array included in a stacked chip a first frame with a first exposure time and a second frame with a second exposure time,
        wherein the first exposure time is longer or shorter than the second exposure time, wherein the pixel array is disposed in a first semiconductor die, wherein the pixel array is partitioned into a plurality of pixel sub-arrays, wherein each one of the plurality of pixel sub-arrays is arranged into a plurality of pixel groups, and wherein each one of the plurality of pixel groups is arranged into a p×q array of pixel cells, wherein p and q are positive integers, wherein capturing the first frame and the second frame include using the first exposure time and the second exposure time, respectively, on same pixels in the pixel array;
    acquiring by a plurality of readout circuits included in the stacked chip an image data of the first frame and an image data of the second frame, wherein the plurality of readout circuits are included in readout circuitry disposed in a second semiconductor die, wherein each one of the plurality of pixel sub-arrays is coupled to a corresponding one of the plurality of readout circuits through a corresponding one of a plurality of conductors;

converting by a plurality of ADC circuits included in the readout circuits, respectively, the image data of the first frame from analog to digital to obtain a first ADC output and the image data of the second frame from analog to digital to obtain a second ADC output; and adding by a function logic included in the stacked chip the first and second ADC outputs to generate a final ADC output, wherein the function logic is disposed in the second semiconductor die.

2. The method of claim 1, further comprising storing by the function logic the first ADC output.

3. The method of claim 2, further comprising performing by an external host HDR combination and linearization.

4. The method of claim 3, wherein the HDR combination and linearization is performed on a per pixel, per pixel cluster, or per sub-array basis.

5. The method of claim 3, wherein each one of the plurality of pixel groups includes pixel support circuitry coupled to and shared by the p×q array of pixel cells included in said each one of the plurality of pixel groups.

6. The method of claim 1, further comprising determining by an automatic exposure control logic a ratio of the first exposure time to the second exposure time.

7. The method of claim 6, wherein a gain factor is determined by the ratio of the first exposure time to the second exposure time.

8. The method of claim 1, wherein each one of the plurality of pixel sub-arrays is arranged into a plurality of n×m pixel groups.

9. The method of claim 1, wherein n, m, p and q are integers greater than 1.

10. A stacked chip high dynamic range (HDR) imaging system comprising:
    a pixel array disposed in a first semiconductor die, wherein the pixel array is partitioned into a plurality of pixel sub-arrays, wherein each one of the plurality of pixel sub-arrays is arranged into a plurality of pixel groups, and wherein each one of the plurality of pixel groups is arranged into a p×q array of pixel cells, wherein p and q are positive integers,
    wherein the pixel array captures a first frame with a first exposure time and a second frame with a second exposure time, wherein the first exposure time is longer or shorter than the second exposure time;
    a plurality of readout circuits included in readout circuitry disposed in a second semiconductor die, wherein each one of the plurality of pixel sub-arrays is coupled to a corresponding one of the plurality of readout circuits through a corresponding one of a plurality of conductors,
    wherein the plurality of readout circuits acquire an image data of the first frame and an image data of the second frame,
    wherein the plurality of readout circuits respectively include analog-to-digital (ADC) circuits that convert the image data of the first frame from analog to digital to obtain a first ADC output and the image data of the second frame from analog to digital to obtain a second ADC output; and
    a function logic coupled to the readout circuitry to add the first and second ADC outputs to generate a final ADC output, wherein the function logic is disposed in the second semiconductor die.

11. The imaging system of claim 10, wherein the function logic to store final ADC output in a frame buffer.

12. The imaging system of claim 10, wherein HDR combination and linearization is performed by an external host.

13. The imaging system of claim 12, The HDR combination and linearization is performed on a per pixel, per pixel cluster, or per sub-array basis.

14. The imaging system of claim 10, further comprising:
    control circuitry disposed in the second semiconductor die coupled to the pixel array to control operation of the pixel array, wherein the control circuitry is disposed in the second semiconductor die.

15. The imaging system of claim 10, wherein the control circuitry includes automatic exposure control logic to determine a ratio of the first exposure time to the second exposure time.

16. The imaging system of claim 15, wherein a gain factor is determined by the ratio of the first exposure time to the second exposure time.

17. The imaging system of claim 10, further comprising an interconnect layer stacked between the first semiconductor die and the second semiconductor die, wherein the plurality of conductors are included in the interconnect layer.

18. The imaging system of claim 10 wherein each one of the plurality of pixel sub-arrays is arranged into a plurality of n×m pixel groups.

19. The imaging system of claim 18 wherein n, m, p and q are integers greater than 1.

20. The imaging system of claim 19 wherein each one of the plurality of pixel groups includes pixel support circuitry coupled to and shared by the p×q array of pixel cells included in said each one of the plurality of pixel groups.

21. The imaging system of claim 20 wherein the pixel support circuitry comprises:
    a floating diffusion node coupled to each one of the pixel cells in the p×q array of pixel cells, wherein each one of the pixel cells in the p×q array of pixel cells includes a photodetector coupled to the pixel support circuitry through a transfer transistor;
    an amplifier transistor coupled to the floating diffusion node;
    a row select transistor coupled between a bit line coupled to the readout circuitry, and the amplifier transistor; and
    a reset transistor coupled between the floating diffusion node and a reset voltage.

22. A method of implementing a stacked chip high dynamic range (HDR) algorithm in an image sensor comprising:
    capturing by a pixel array included in a stacked chip a first frame with a first exposure time, wherein the pixel array is disposed in a first semiconductor die, wherein the pixel array is partitioned into a plurality of pixel sub-arrays, wherein each one of the plurality of pixel sub-arrays is arranged into a plurality of pixel groups, and wherein each one of the plurality of pixel groups is arranged into a p×q array of pixel cells, wherein p and q are positive integers;
    converting by a plurality of ADC circuits included in readout circuits that are included in the stacked chip, respectively, an image data of the first frame from analog to digital to obtain a first ADC output, wherein the plurality of readout circuits are included in readout circuitry disposed in a second semiconductor die, wherein each one of the plurality of pixel sub-arrays is coupled to a corresponding one of the plurality of readout circuits through a corresponding one of a plurality of conductors;

storing the first ADC output;

capturing by the pixel array a second frame with a second exposure time, wherein the first exposure time is longer or shorter than the second exposure time, wherein capturing the first frame and the second frame include using the first exposure time and the second exposure time, respectively, on same pixels in the pixel array;

converting by the ADC circuits an image data of the second frame from analog to digital to obtain a second ADC output;

readout the second ADC output and add by a function logic included in the stacked chip the second ADC output to the stored first ADC output to generate a final ADC output, wherein the function logic is disposed in the second semiconductor die;

storing a final ADC output in a frame buffer included in the function logic; and performing HDR combination and linearization by an external host.

* * * * *